(12) United States Patent
Dash

(10) Patent No.: US 7,765,477 B1
(45) Date of Patent: *Jul. 27, 2010

(54) SEARCHING DUMMY FONT ENCODED TEXT

(75) Inventor: Sambit Kumar Dash, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/935,375

(22) Filed: Nov. 5, 2007

Related U.S. Application Data (63) Continuation of application No. 10/387,611, filed on Mar. 12, 2003, now Pat. No. 7,310,769.

(51) Int. Cl.
G06F 17/00 (2006.01)
(52) U.S. Cl. .............................. 715/269; 715/255
(58) Field of Classification Search .............. 715/200, 715/269, 255–256
See application file for complete search history.

(56) References Cited

U.S. PATENT DOCUMENTS

| | | | |
|---|---|---|---|
| 3,806,871 A | 4/1974 | Shepard | 382/311 |
| 4,091,424 A | 5/1978 | Widergren | 358/3.29 |
| 4,186,413 A | 1/1980 | Mortimer | 348/473 |
| 4,707,801 A | 11/1987 | Barnes et al. | 715/235 |
| 4,723,209 A | 2/1988 | Hernandez et al. | 715/210 |
| 4,879,753 A | 11/1989 | El-Sherbini | 382/270 |
| 4,907,285 A | 3/1990 | Nakano et al. | 382/176 |
| 4,914,709 A | 4/1990 | Rudak | 382/311 |
| 4,974,260 A | 11/1990 | Rudak | 382/311 |
| 4,985,863 A | 1/1991 | Fujisawa et al. | 382/181 |
| 5,020,112 A | 5/1991 | Chou | 382/226 |
| 5,086,497 A | 2/1992 | Horikawa et al. | 715/209 |
| 5,146,552 A | 9/1992 | Cassorla et al. | 715/234 |
| 5,159,667 A | 10/1992 | Borrey et al. | 715/205 |
| 5,455,871 A | 10/1995 | Bloomberg et al. | 382/173 |
| 5,455,875 A | 10/1995 | Chevion et al. | 382/311 |
| 5,475,805 A | 12/1995 | Murata | 715/201 |
| 5,526,477 A | 6/1996 | McConnell et al. | 345/467 |

(Continued)

FOREIGN PATENT DOCUMENTS

DE 0006131 5/1979

(Continued)

OTHER PUBLICATIONS

"Word Perfect Envoy 1.0a" WP Corp., White Paper, WWW, Dec. 13, 1995.

(Continued)

*Primary Examiner*—Stephen S Hong
*Assistant Examiner*—Manglesh M Patel
(74) *Attorney, Agent, or Firm*—Fish & Richardson P.C.

(57) ABSTRACT

Methods and apparatus, including computer program products, to process an electronic document that includes a non-coded representation of characters of text. Based on text coding information that identifies the characters of the non-coded representation, a coded representation is generated and associated with the non-coded representation. In the coded representation, each identified character has a code value. Each code value is associated with a glyph that has no semantic relation with the identified character. A visual representation of the non-coded representation can be displayed, and the coded representation can be used to identify or search characters in the visual representation.

30 Claims, 5 Drawing Sheets

U.S. PATENT DOCUMENTS

| | | | |
|---|---|---|---|
| 5,542,006 A | 7/1996 | Shustorovich et al. | 382/156 |
| 5,581,682 A | 12/1996 | Anderson et al. | 715/236 |
| 5,590,317 A | 12/1996 | Iguchi et al. | 707/2 |
| 5,625,711 A | 4/1997 | Nicholson et al. | 382/224 |
| 5,664,086 A | 9/1997 | Brock et al. | 345/468 |
| 5,689,717 A | 11/1997 | Pritt | 715/234 |
| 5,729,637 A | 3/1998 | King et al. | 382/282 |
| 5,737,733 A | 4/1998 | Eller | 707/3 |
| 5,748,807 A | 5/1998 | Lopresti et al. | 382/310 |
| 5,751,849 A | 5/1998 | Ikeda | 382/176 |
| 5,832,474 A | 11/1998 | Lopresti et al. | 382/310 |
| 5,848,184 A | 12/1998 | Taylor et al. | 382/173 |
| 5,857,212 A | 1/1999 | Van De Vanter | 715/234 |
| 5,873,111 A | 2/1999 | Edberg | 715/202 |
| 5,883,986 A * | 3/1999 | Kopec et al. | 382/310 |
| 5,893,125 A | 4/1999 | Shostak | 715/206 |
| 5,926,565 A | 7/1999 | Froessi | 382/181 |
| 5,999,649 A | 12/1999 | Nicholson et al. | 382/190 |
| 6,038,342 A | 3/2000 | Bernzott et al. | 382/173 |
| 6,366,695 B1 | 4/2002 | Nicholson et al. | 382/173 |
| 6,385,350 B1 | 5/2002 | Nicholson et al. | 382/309 |
| 6,583,789 B1 | 6/2003 | Carlson et al. | 345/471 |
| 6,661,919 B2 | 12/2003 | Nicholson et al. | 382/173 |
| 6,701,023 B1 | 3/2004 | Gaither et al. | 382/254 |
| 6,903,751 B2 | 6/2005 | Saund et al. | 345/619 |
| 2001/0041005 A1 | 11/2001 | Fujiwara | 707/5 |
| 2004/0037470 A1 | 2/2004 | Simske | 382/229 |

FOREIGN PATENT DOCUMENTS

| | | |
|---|---|---|
| EP | 0024521 | 1/1984 |
| EP | 0098958 | 1/1984 |
| EP | 0415373 | 3/1991 |
| EP | 0539106 | 4/1993 |
| EP | 0564201 | 10/1993 |
| WO | 94/06241 | 3/1994 |

OTHER PUBLICATIONS

"Common Ground Version 2.0," Common Ground Software, Inc., White Paper, 222, Dec. 13, 1995.

"TruDoc Software Development Kit", Bitstream Corp., White Paper, www.Dec. 13, 1995.

Iwaki et al., "A Segmentation Method Based on Office Document Hierarchial Structure", IEEE 1987, pp. 759-763.

"Adobe CMap and CIDFont File Specification", Technical Note #5014, Adobe Systems Incorporated, Oct. 8, 1996.

"Building CMap Files for CID-Keyed Fonts", Technical Note #5099, Adobe Systems Incorporated, Oct. 14, 1998.

Leisher, Mark, "The Last Resort Glyph and BDF Font", Oct. 11, 1999, pp. 1-2.

Optical Character Recognition Range: 2440-245F, Jun. 2001, The Unicode Standard Version 3.0, pp. 1-3.

\* cited by examiner

SEARCHING DUMMY FONT ENCODED TEXT

CROSS-REFERENCE TO RELATED APPLICATION

This application is a continuation of prior U.S. application Ser. No. 10/387,611, filed Mar. 12, 2003, the entire contents of which are hereby incorporated by reference.

BACKGROUND OF THE INVENTION

The present invention relates to processing electronic documents.

Written or printed language is typically represented as a sequence of characters. A character is an abstract symbol that can be used as a building block for representing more complex concepts, e.g., text. An electronic document, i.e., a named electronic data collection, can represent text using coded or non-coded representations.

A coded representation specifies a sequence of code values, where each code value represents a character of the text. A coded representation is based on a character encoding that defines a character collection and, for each character in the collection, a code value identifying the character. Therefore, the character encoding provides a mapping between the code values in the coded representation and corresponding characters in the collection. Coded representations are typically based on standard character encoding, such as the American Standard Code for Information Interchange ("ASCII") or the Unicode Standard ("Unicode"). ASCII encoding defines a character collection that includes 128 characters corresponding to letters, numbers, punctuation marks, and other abstract symbols to represent printed English text. Unicode is a language independent encoding that defines a character collection including more than 65000 characters. Alternatively or in addition, coded representations can be based on character encoding that is manufacturer or application specific.

In addition to code values, a coded representation typically specifies one or more fonts. A font associates glyphs with code values that represent characters according to a character encoding. A glyph is a graphical representation that specifies a visual appearance of the abstract symbol of a character, and typically includes one or more bitmap or vector graphics objects. For example, standard fonts can specify glyphs with different designs, called typefaces, such as Times Roman, Helvetica or Courier. The association between the glyphs and the code values can be direct or indirect, explicit or implicit. In any case, when the coded representation is printed or displayed, the characters of the text are rendered using the glyphs associated with the code values. Typically, there is a semantic relation between a glyph and a character represented by the associated code value, i.e., the glyph recognizably represents the character to a human reader. Optionally, however, a font can associate a default glyph with code values that represent characters for which the font has no glyph with proper semantic relation.

A non-coded representation specifies a visual representation, i.e., an image, of a text without reference to character encoding. For example, a non-coded representation can include text scanned from a printed document. The scanned text is typically represented as bitmap graphics objects without any coding information about the characters in the text. Similarly, several applications (e.g., AutoCAD® design software, available from AutoDesk Inc. of San Rafael, Calif.) print text to electronic documents (e.g., in Adobe® Portable Document Format, "PDF") using only graphics objects representing the glyphs without specifying the corresponding code values. While humans may read a text in an image that is specified by a non-coded representation, text processing applications, such as word processors or text layout programs, cannot manipulate the text without coding information that identifies the characters represented by the non-coded representation.

SUMMARY OF THE INVENTION

A non-coded representation of characters of text is associated with a coded representation, where the coded representation specifies code values representing the characters of text and associates the specified code values with glyphs that are insufficient to semantically represent the characters of text. In general, in one aspect, the invention provides methods and apparatus, including computer program products, implementing techniques for processing an electronic document that includes a non-coded representation of characters of text. The techniques include receiving text coding information, generating a coded representation based on the text coding information, and associating the coded representation with the non-coded representation. The text coding information identifies the characters represented by the non-coded representation. The coded representation represents each identified character with a code value, and each code value is associated in the coded representation with a glyph that has no semantic relation with the identified character.

Particular implementations can include one or more of the following features. All code values in the coded representation can be associated with a single glyph. The code values can represent the identified characters based on Unicode encoding. A coded representation can include a font that defines a collection of glyphs and associates each code value representing an identified character with a glyph in the collection of glyphs. The collection of glyphs can include a default glyph, and the font can associate one or more code values representing identified characters with the default glyph.

A code value of an identified character can be associated with one or more positions in a visual representation of the non-coded representation. The visual representation of the non-coded representation can be displayed. User input can be received for selecting a position in the visual representation. The coded representation associated with the non-coded representation can be used to identify characters associated with the selected positions of the visual representation. In the visual representation of the non-coded representation, the characters associated with the selected positions can be highlighted. Associating the coded representation with the non-coded visual representation can include associating a code value of an identified character with a portion of the non-coded representation.

In a displayed visual representation of the non-coded representation, a glyph of the coded representation can be rendered. The glyph can be associated in the coded representation with a code value representing an identified character. The glyph can be rendered as hidden text. Rendering the glyph can include scaling the glyph to match a bounding box of the identified character in the visual representation of the non-coded representation.

The coded representation and the non-coded representation can be stored in a single document. The coded representation can be stored in a first document and the non-coded representation can be stored in a second document. Associating the coded representation with the non-coded representation can include associating the first document with the second document.

The coded representation can be searched to find a character sequence including one or more characters. In a displayed visual representation of the non-coded representation, character sequences that match the searched character sequence can be highlighted.

In general, in another aspect, the invention provides methods and apparatus, including computer program products, implementing techniques for processing an electronic document that includes a non-coded representation of characters of text. The techniques include receiving text coding information, generating a coded representation based on the text coding information, and associating the coded representation with the non-coded representation. The text coding information identifies the characters represented by the non-coded representation. The coded representation represents each identified character with a code value, and each code value is associated in the coded representation with a glyph in a collection of glyphs. The collection of glyphs is insufficient to represent semantics of the identified characters.

Particular implementations can include one or more of the following features. The collection of glyphs can consist of a single glyph. The code values can represent the identified characters based on Unicode encoding. A visual representation of the non-coded representation can be displayed. The coded representation can be used to identify one or more characters represented in the non-coded representation. The identified characters can be highlighted in the visual representation of the non-coded representation.

In general, in another aspect, the invention provides methods and apparatus, including computer program products, implementing techniques for processing an electronic document that includes a non-coded representation of characters of text. The techniques include receiving text coding information, generating a coded representation based on the text coding information, and associating the coded representation with the non-coded representation. The text coding information identifies the characters represented by the non-coded representation. The coded representation specifies a code value for each identified character and associates all of the specified code values with a single glyph.

Particular implementations can include one or more of the following features. The coded representation can specify a code value for each identified character based on Unicode encoding. The coded representation can include a font that associates any Unicode value with the single glyph. The single glyph can be a default glyph of the font.

In general, in another aspect, the invention provides an electronic document tangibly embodied in an information carrier. The electronic document includes a non-coded representation specifying a visual representation of characters of text, a coded representation, and information associating the non-coded representation with the coded representation. The coded representation represents each of the characters of text with a code value, and each code value is associated in the coded representation with a glyph having no semantic relation with the character represented by the code value.

Particular implementations can include one or more of the following features. The coded representation can specify a collection of glyphs that is insufficient to represent semantics of the characters of text and associates each code value in the coded representation with a glyph in the collection. The collection of glyphs can consist of a single glyph. The information associating the non-coded representation with the coded representation can include positional information associating one or more images in the visual representation specified by the non-coded representation with code values representing characters in the coded representation.

The invention can be implemented to realize one or more of the following advantages. By using both coded and non-coded representations of text in a single hybrid document, the text in the document can be processed, e.g., searched, in a traditional way without requiring traditional fonts. The coded representation can use a small-sized dummy font to reduce the size of the hybrid document. The coded representation does not have to include large fonts or rely on the fonts available in the system. The coded representation does not require a full mapping between character codes and glyphs. The coded representation does not require a detailed definition for appearances of multiple glyphs. By using the Unicode encoding, the coded representation can be language independent. The coded representation can be used to identify characters represented by the non-coded representation. For example, based on the coded representation, a search engine can find characters in the text. Even though the coded representation may not specify any character-specific glyphs, the non-coded representation can be used to render the text. The coded representation can be rendered as hidden text to avoid interference with an image specified by the non-coded representation. In the coded representation, the dummy font can specify only a single glyph, such as a default glyph. The default glyph can be used to highlight text in the image specified by the non-coded representation. For example, the default glyph can be rendered over the image specified by the non-coded representation at positions corresponding to characters to be highlighted, e.g., characters that are found by the search engine or selected by a user. To avoid interference with the image of a highlighted character, the default glyph can be scaled to match a bounding box of the character, or the background color can be changed in the bounding box.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
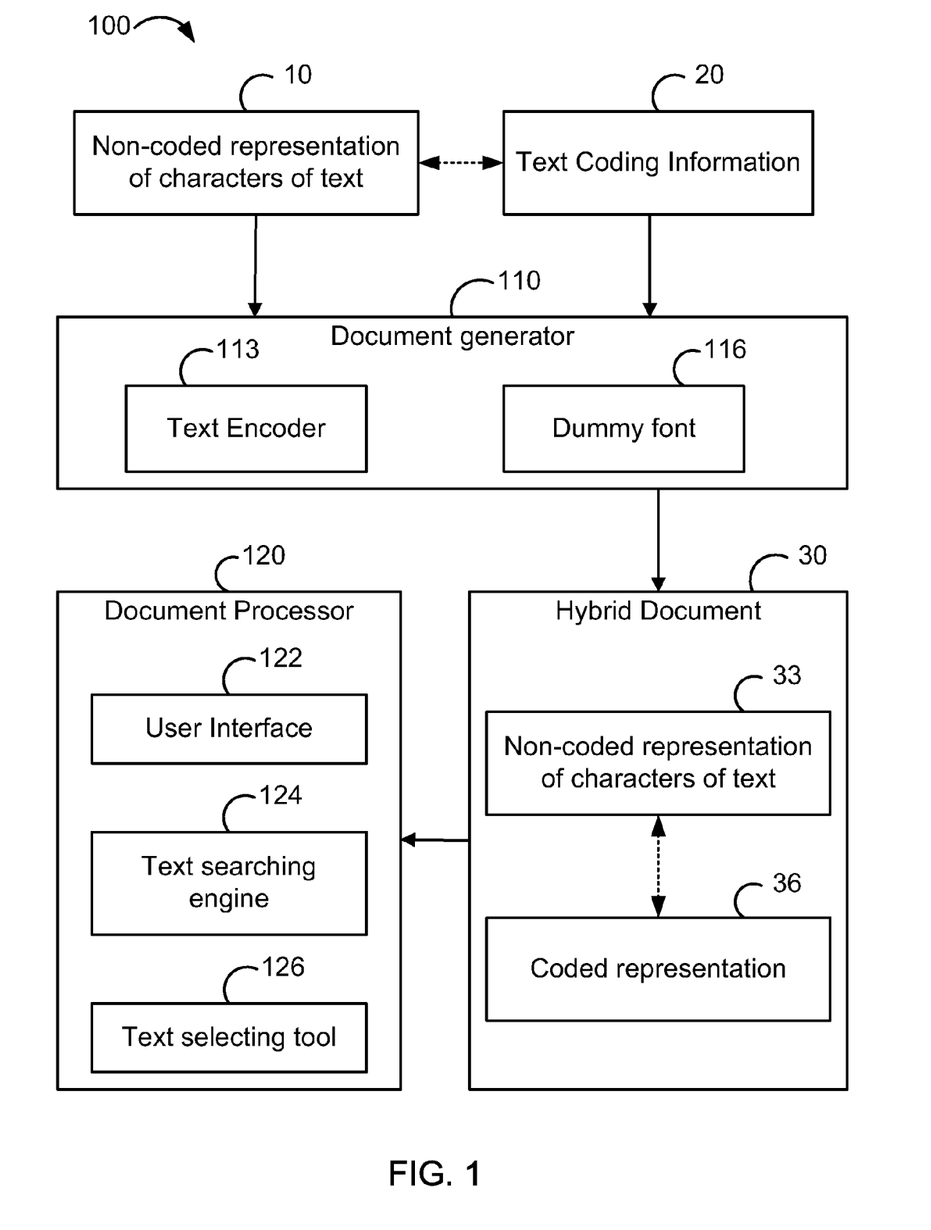
FIG. 1 is a schematic diagram showing a system for generating and processing hybrid documents including non-coded and associated coded representations of characters of text.

FIG. 1 shows a system 100 for generating and processing electronic documents according to one aspect of the invention. The system 100 includes a document generator 110 and a document processor 120. The document generator 110 uses a non-coded representation 10 of characters of text and corresponding text coding information 20 to generate a hybrid document 30 that can be processed, e.g., searched, by the document processor 120.

The non-coded representation 10 specifies a visual representation, i.e., an image, of text, e.g., in an electronic document. The image of the text can be represented, for example, by bitmap or vector graphics objects. The non-coded representation 10 can be generated, e.g., by a scanner or any other electronic device (e.g., a digital camera) or a computer application (e.g., an image processor) that is capable of generating digital images. Alternatively, the non-coded representation 10 can be generated by an application that prints text to a target document without associating encoding information with the non-coded representation 10. For example, AutoCAD prints text to PDF documents without font or encoding information, using only vector graphics.

The text coding information 20 identifies characters in the text represented by the non-coded representation 10. For example, the text coding information 20 can specify a character encoding, such as ASCII or Unicode, and a sequence of code values, where each code value in the sequence represents a corresponding character in the text according to the specified character encoding. Alternatively, the text coding information 20 can use names or any other identifiers of the characters in the text. Optionally, the text coding information 20 can identify, for each character in the text, one or more graphics objects representing the character in the non-coded representation 10. In addition, the text coding information 20 can specify a position and/or size of a bounding box for each character in the image specified by the non-coded representation 10.

The document generator 110 includes a text encoder 113 and a dummy font 116. The text encoder 113 can use the text coding information 20 and the dummy font 116 to generate a coded representation 36. The coded representation 36 specifies a sequence of code values representing characters in the text based on a character encoding for a specified character collection (e.g., ASCII or Unicode characters). The dummy font 116 associates all code values representing characters in the collection with only a small collection of "dummy" glyphs. That is, the dummy font 116 specifies a collection of glyphs that is insufficient to semantically represent the characters represented by the code values in the coded representation. For example, the glyphs in the collection may not have any semantic relation with most or all of the characters represented in the coded representation. In addition, the number of glyphs in the collection can be substantially smaller than the number of characters in the character collection such that each glyph in the collection is associated with multiple characters with which the glyph has no semantic relation. In one implementation, the collection of glyphs can be insufficient to semantically represent text in any language.

In one implementation, the dummy font 116 associates a single glyph with all code values representing characters in a character collection. The single glyph can be a default glyph having no semantic association with any character in the character collection, such as is conventionally used to represent characters for which no glyph is expressly specified in the font. Alternatively, the single glyph can include a bounding box. Optionally, the single glyph can have a semantic association with one or more characters in the character collection. In an alternative implementation, the character collection is divided into subsets, such as disjoint subsets including one or more characters, where the number of subsets is substantially smaller than the number of characters in the collection, and the dummy font associates a different single glyph with each subset in the character collection. For example in Unicode, the character collection can be divided into subsets, where each subset includes characters to represent a different language and the dummy font can associate a different single glyph with characters of different languages. An exemplary coded representation using a dummy font is discussed with reference to FIGS. 3A-3C.

The document generator 110 can combine the generated coded representation 36 with a corresponding non-coded representation 33 of characters of text in the hybrid document 30. For example, the non-coded representation 33 can be the same as the non-coded representation 10. Alternatively, the document generator 110 can generate the non-coded representation 33 by altering the non-coded representation 10, e.g., by rasterizing vector graphics objects. Details of generating coded representations and hybrid documents are discussed in detail with reference to FIG. 2.

The hybrid document 30 can be processed by the document processor 120 that includes a user interface 122, a text searching engine 124, and a text selecting tool 126. The user interface 122 can receive user input and display the hybrid document 30 to a user. The text searching engine 124 can search characters in the hybrid document 30 by using the coded representation 36, as discussed in more detail with reference to FIG. 4. The text selecting tool 126 can use both the coded 36 and the non-coded 33 representations to select portions of the text, e.g., based on user input, as discussed in more detail with reference to FIG. 6.

Figure 2:
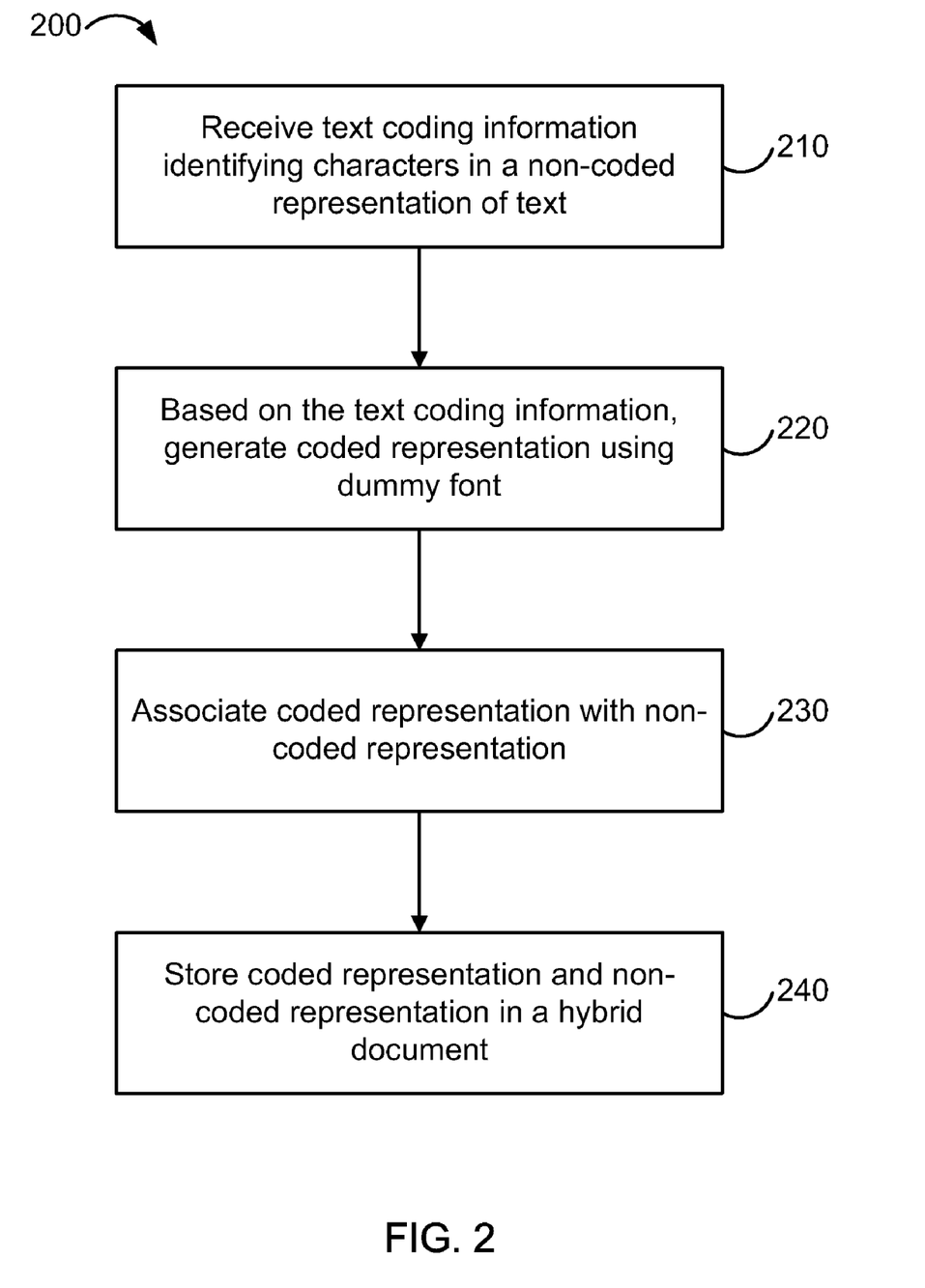
FIG. 2 is a schematic flow chart showing a method for generating hybrid documents.

FIG. 2 shows a method 200 for generating a hybrid document according to one aspect of the invention. The method starts by receiving text coding information that identifies characters in a non-coded representation of text (step 210). For example, the document generator 110 receives the text coding information 20 about the non-coded representation 10 (FIG. 1). The text coding information can be received from a computer application that generated (e.g., AutoCAD) or processed (e.g., an optical character recognition, "OCR", system) the non-coded representation. Alternatively or in addition, the text coding information can be received from a user. For example, a user can identify characters that an OCR system has failed to recognize.

Based on the received text coding information, a coded representation is generated using a dummy font (step 220). For example, the text encoder 113 generates the coded representation 36 using the dummy font 116 (FIG. 1). The generated coded representation identifies characters in the non-coded visual representation by using code values based on a character encoding, such as Unicode. The dummy font specifies a small number of glyphs (such as a single glyph) that can be used to render the characters identified by the code values.

In one implementation, the coded representation specifies a sequence of code values representing the characters in the text. The code values can be received in or calculated from the text coding information. For example, if the text coding information identifies characters based on a character encoding other than the character encoding used by the coded representation, the code values can be calculated using a mapping between the two character encodings. In one implementation, the system uses Unicode encoding so the coded representation is language independent, i.e., the same coded representation can be used in any language environment.

The dummy font associates one or more glyphs with code values that represent characters in a character collection according to the character encoding. To minimize the size of the coded representation, the dummy font can specify only a small number of glyphs independently from the number and type of characters in the character collection. In addition, the dummy font can be defined to avoid using character-specific glyphs (i.e., glyphs that have a semantic relationship with characters in a language or languages), so the coded representation can be rendered the same way in any language environment. An exemplary coded representation and dummy font is discussed with reference to FIGS. 3A-3C.

The coded representation is associated with the non-coded representation (step 230). In one implementation, the coded and non-coded representations are associated using positional information about the text. For example, for each character identified in the coded representation, the positional information can specify a position (or positions defining a bounding box) that locates the same character in the image specified by the non-coded representation. In one implementation, the positional information is included in the coded representation such that, if rendered, the glyphs of the coded representation would "overwrite" the corresponding characters represented in the non-coded representation. Alternatively or in addition, pointers or tags can associate code values in the coded representation with graphics objects in the non-coded representation. For example, the same tag can mark a character both in the coded and non-coded representations, or a pointer in a coded representation can point to the associated non-coded representation (and/or vice versa).

The coded and non-coded representations are stored in a single hybrid document (step 240). The coded and non-coded representations can be adapted to conform to standard formats, such as PDF, for document storage. The hybrid document can be processed, e.g. searched, with document processors, as discussed with reference to FIGS. 4 and 6. In an alternative implementation, the coded and non-coded representations are stored in separate but related documents. The relationship can be defined, for example, by document pointers that identify related documents. The document pointers can be included in one or more of the related documents. By using the document pointers, the related documents can be processed in a similar way than the hybrid document.

Figure 3A:
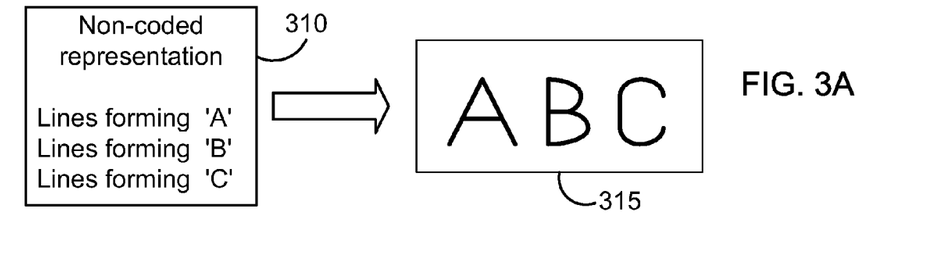
FIGS. 3A-3C are schematic diagrams showing exemplary non-coded and associated coded representations of characters of text.

FIG. 3A illustrates an exemplary non-coded representation 310 of characters of text. The non-coded representation 310 specifies a visual representation, i.e., an image 315, of a sequence of characters, in the example, the letters 'A', 'B', and 'C'. The non-coded representation 310 represents the sequence of characters with lines forming images of the letters 'A', 'B', and 'C'. In alternative implementations, the non-coded representation can include pixels or vector graphics objects other than lines. The non-coded representation 310 specifies only a visual appearance of the letters, but does not include coding information specifying that the image 315 represent characters of a text.

Figure 3B:
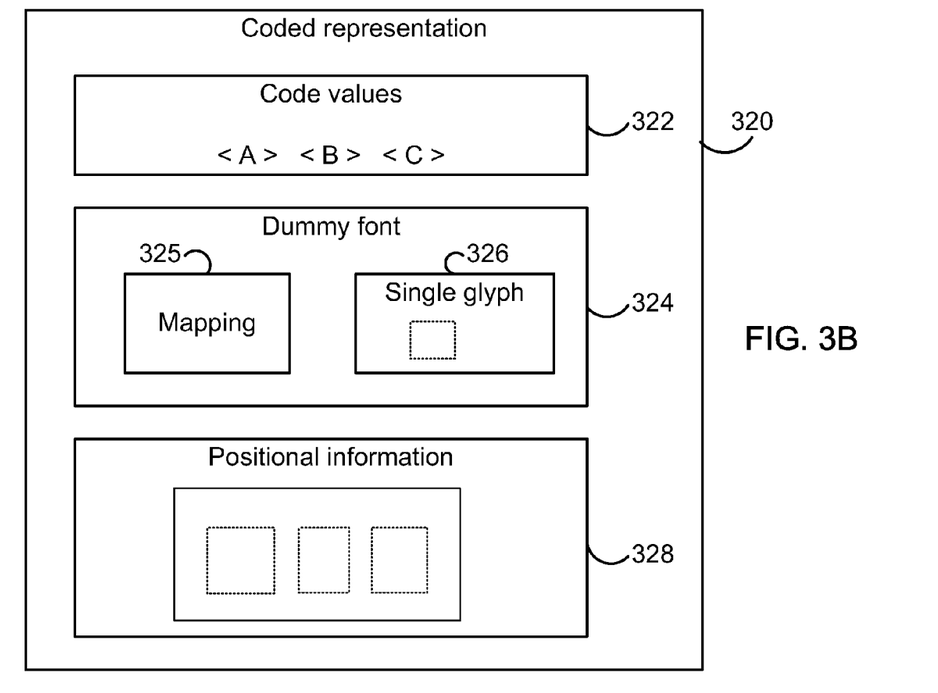

FIG. 3B illustrates a coded representation 320 that associates coding information with the non-coded representation 310. The coded representation 320 includes a sequence of code values 322, a dummy font 324, and positional information 328. The sequence 322 specifies code values <A>, <B>, and <C> that represent the letters 'A', 'B', and 'C', respectively, according to a character encoding. In the coded representation, the character encoding can be a standard character encoding, such as ASCII or Unicode. Alternatively, the character encoding can be specified, for example, by a character map in the coded representation. The character map associates the code values used in the sequence 322 with code values of a standard character encoding, as discussed in more detail with reference to FIG. 5.

The dummy font 324 includes a mapping 325 and a single glyph 326. The mapping 325 associates glyphs with code values of the sequence 322. Because the dummy font 324 specifies no other glyphs, the mapping 325 associates the single glyph 326 with any code value of the character encoding. In one implementation, the single glyph 326 is a default glyph representing characters that are undefined in the coded representation according to the character encoding. Typically, the default glyph has no semantic relationship with any character in a character collection of the character encoding. In the example, the single glyph 326 is a rectangle. Alternatively, the single glyph can be defined to have other shape or represent a character in the character collection.

The positional information 328 associates characters represented in the coded representation 320 with locations in the image 315 defined in the non-coded representation 310. For each character represented in the coded representation 320, the positional information 328 specifies a location and size that defines a bounding box for the character in the image 315. When rendering characters in the coded representation, the single glyph 326 can be scaled to match the bounding boxes defined in the positional information 328.

In an alternative implementation, the positional information can specify only a single bounding box for multiple characters, or only a location for each character in the coded representation. In one implementation, instead of using the positional information 328, the non-coded 310 and coded 320 representations are associated by tags. For example, the tags can mark, for each code value in the coded representation 320, the corresponding graphics objects, e.g., lines, in the non-coded representation 310.

Figure 3C:
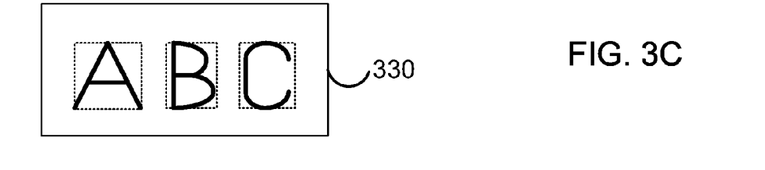

FIG. 3C illustrates an image 330 composed of two images: the image 315 specified by the non-coded representation 310 is overlaid by another image generated by rendering the coded representation 320 using the single glyph 326 and the positional information 328. As shown in FIG. 3C, where the single glyph is defined as a rectangle, the single glyph can be scaled to match the bounding box of the corresponding character in the image 315. If it is desired to avoid any interference with the image 315 of the text specified by the non-coded representation, the coded representation can be rendered as hidden text. For example, the glyphs of the coded representation can be rendered by the same color as the background. Alternatively, the glyphs can be rendered as being fully transparent.

Figure 4:
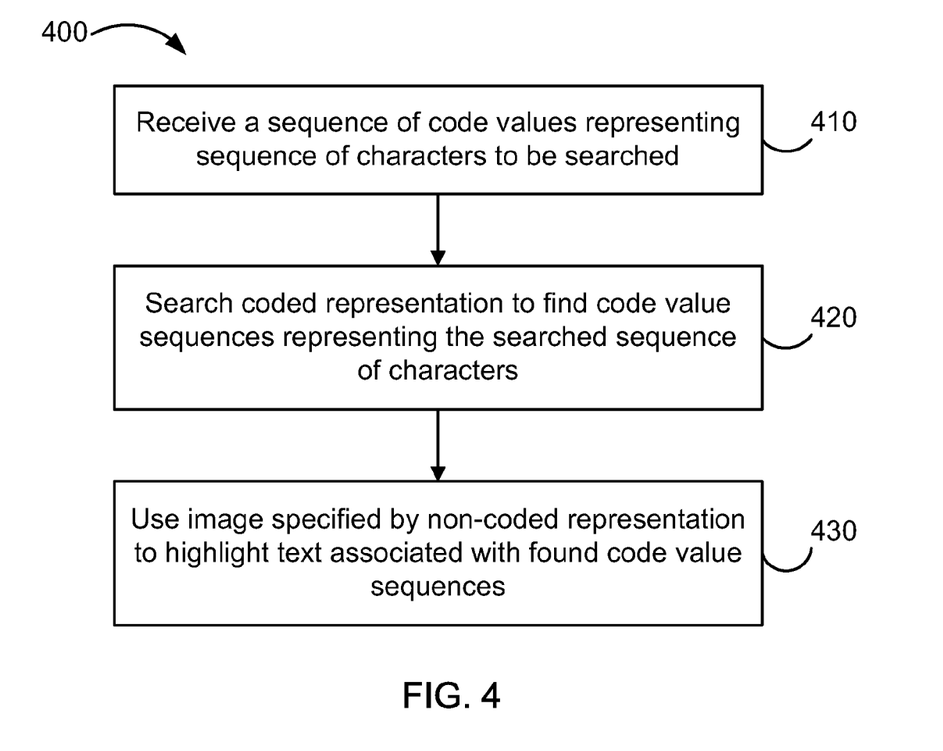
FIG. 4 is a schematic flow chart showing a method for searching characters in a hybrid document.

FIG. 4 shows a method 400 for searching a sequence of characters in a hybrid document that includes non-coded and associated coded representations of text. The method 400 can be performed by, e.g., a system including a document processor such as the document processor 120 (FIG. 1). The method starts by receiving a sequence of code values that, according to a character encoding, represent the sequence of characters to be searched (step 410). The sequence of code values can be received, for example, from a user interface of the document processor or from any other application searching the hybrid document.

The system searches the coded representation to find code value sequences that represent the searched sequence of characters (step 420). If the coded representation and the received sequence use the same character encoding (e.g., Unicode), the code values in the received sequence can be directly used to find a matching sequence of code values in the coded representation. If the character encoding is different in the received sequence and in the coded representation, one or more character maps can be used to map code values to a common character encoding before trying to find matching sequences of code values. In one implementation, the common character encoding is Unicode. For example, using character maps such as the character map discussed with reference to FIG. 5, the code values in the received sequence and/or in the coded representation can be mapped to Unicode values. In one implementation, a "to-Unicode" character map is included in a dummy font of the coded representation. Alternatively, character maps can be provided by the system.

In an alternative implementation, the system identifies all characters represented in the coded representation of the hybrid document before starting the search, generates a table that includes Unicode values and pointers to the identified characters, and performs the search using the data in the generated table.

The system uses the image specified by the non-coded representation to highlight text associated with code value sequences found in the coded representation (step 430). In one implementation, a user interface displays the image specified by the non-coded representation. By using a single glyph of the dummy font, the system renders the found characters in the coded representation over the displayed image. The dummy font can specify a single glyph that, when rendered over the displayed image, contrasts the visual representation of the found characters with the rest of the image. For example, the single glyph can be a rectangle that is positioned and scaled to match a bounding box enclosing the image of the found characters to give the appearance of highlighted text. Alternatively, background color can be altered in the bounding box of the found characters, or pointers can identify which graphics objects in the non-coded representation are associated with the found characters, and the identified graphics objects can be altered, e.g., by changing their color or line thickness, to give the appearance of highlighted text.

Figure 5:
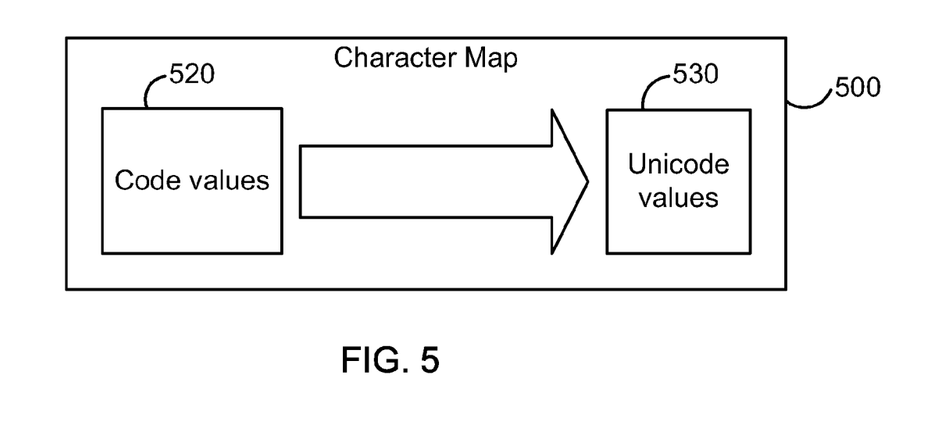
FIG. 5 is a schematic diagram showing an exemplary character map.

FIG. 5 shows an exemplary character map 500 that associates code values 520 with Unicode values 530. As discussed above with reference to FIGS. 3 and 4, the character map 500 can be included in a dummy font to specify a character encoding used in a coded representation. In such implementations, the code values 520 represent characters in a coded representation of text (e.g., in the sequence of code values 322, FIG. 3B). The Unicode values 530 identify characters in the character collection of the Unicode Standard. In one implementation, the code values 520 are also Unicode values, and the character map 500 is an identity map that associates each code value with an identical Unicode value. In alternative implementations, the code values 520 can be code values of ASCII or any other character encoding whose character collection is a subset of the Unicode character collection.

Figure 6:
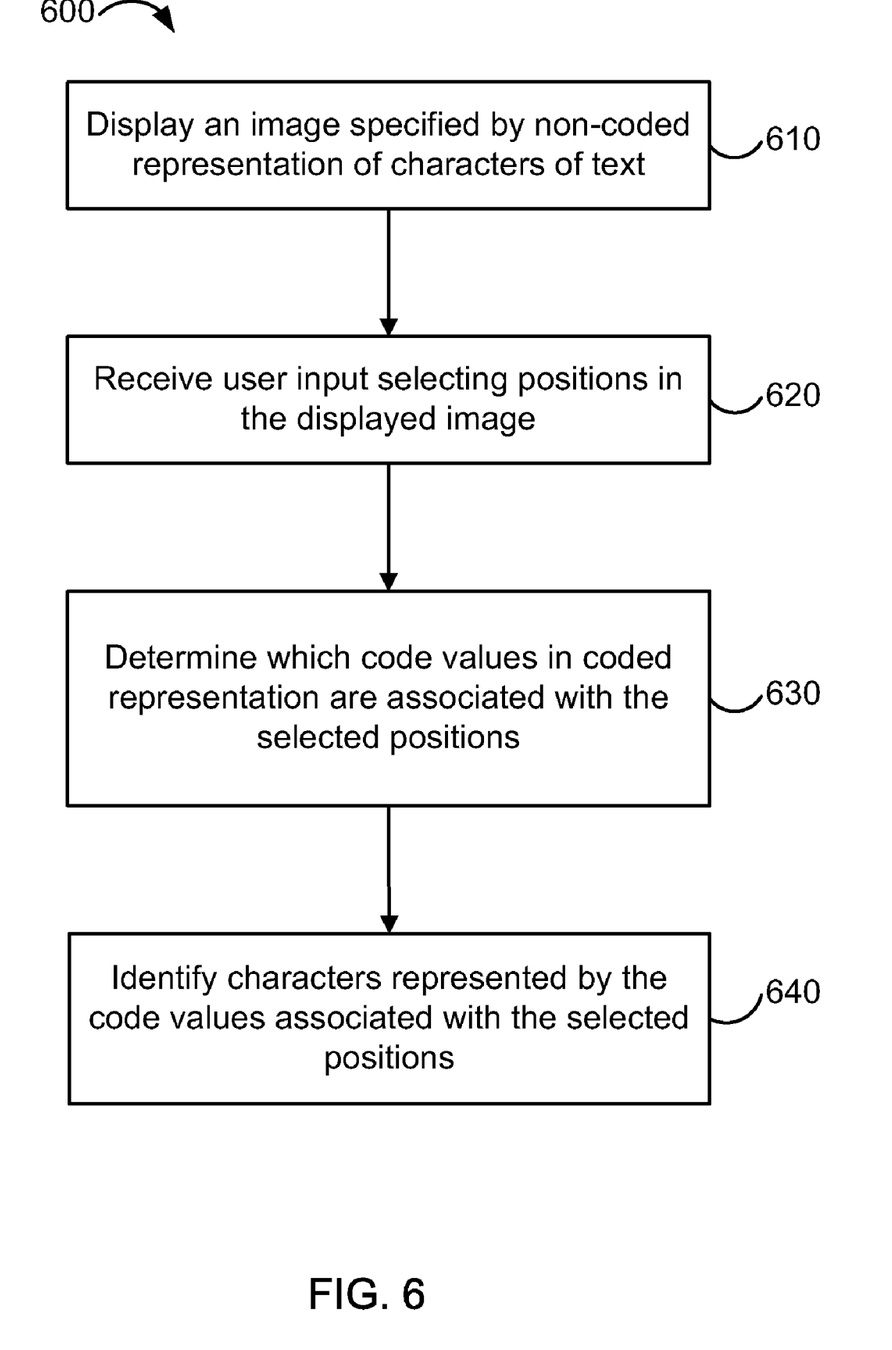
FIG. 6 is a schematic flowchart showing a method for selecting characters in a text represented by a hybrid document.

FIG. 6 shows a method 600 for selecting characters in a text represented in a hybrid document that includes non-coded and associated coded representations. The method can be performed, for example, by the document processor 120 of the system 100 (FIG. 1). A visual representation, i.e., an image, of the text is displayed using the non-coded representation (step 610), e.g., in a graphical user interface. The system receives user input selecting one or more positions in the displayed image (step 620). For example, a selecting tool can point to a location or select an area corresponding to an image of a character in the text as displayed in the graphical user interface. Optionally, the system can provide feedback to the user by highlighting the selected character, e.g., by using the techniques discussed with reference to FIG. 4.

The system determines which code values in the coded representation are associated with the selected positions in the image (step 630). To determine these code values, the system can use positional information about the characters represented, and optionally included, in the coded representation (e.g., FIG. 3B). For example, the system can identify those code values that represent characters whose bounding box, according to the positional information, includes one or more of the selected positions.

The system identifies selected characters that are represented by the code values associated with the selected positions (step 640). If the coded representation represents characters based on a character encoding that is recognized by the system (e.g., a standard encoding such as Unicode or ASCII), the selected characters can be directly identified based on the code values associated with the selected positions. If, on the other hand, the coded representation represents characters based on a proprietary character encoding (e.g., using font specific character identifiers), a character map can map the code values in the coded representation to code values defined in a standard encoding. For example, a dummy font of the coded representation can include a character map that can be used to determine a Unicode value for each code value in the selection. Alternatively, the system can specify the character map. The selected characters can be manipulated as recognized text—e.g., the selected characters can be copied and pasted at another location in the same or a different document, or can be used to search the same or a different document.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

By way of example, a printing device implementing an interpreter for a page description language, such as the PostScript® language, includes a microprocessor for executing program instructions (including font instructions) stored on a printer random access memory (RAM) and a printer read-only memory (ROM) and controlling a printer marking engine. The RAM is optionally supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium.

The invention has been described in terms of particular embodiments. Other embodiments are within the scope of the following claims. For example, the steps of the invention can be performed in a different order and still achieve desirable results.

What is claimed is:

1. A computer-implemented method for searching an electronic document that includes a non-coded representation of characters of text, the method comprising:
    receiving text coding information identifying each of a plurality of characters of text represented by the non-coded representation;
    based on the text coding information, generating a coded representation that:
        specifies, for each of the plurality of characters of text represented by the non-coded representation, a respective code value based on a character encoding, the code value selected to represent the respective character of text, and
        associates a particular glyph from a collection of glyphs with each of the code values specified for the plurality of characters of text, the particular glyph selected independently of any relation to the respective character of text, the collection of glyphs being insufficient to semantically represent the plurality of characters of text;
    associating the coded representation with the non-coded representation, wherein a code value of one of the plurality of characters of text is associated with one or more positions in a visual representation of the non-coded representation;
    displaying the visual representation of the non-coded representation;
    searching the coded representation to find a coded character sequence that includes one or more characters at a location in the coded representation;
and
    highlighting, in the displayed visual representation of the non-coded representation, the portion of the non-coded visual representation associated with the coded character sequence at the location in the coded representation.

2. The method of claim 1, wherein:
generating a coded representation includes specifying a font that defines the collection of glyphs and associating each code value with a glyph in the collection of glyphs.

3. The method of claim 2, wherein:
the collection of glyphs includes a default glyph, and the font associates one or more code values representing corresponding one or more characters of text with the default glyph.

4. The method of claim 1, wherein:
the collection of glyphs consists of a single glyph.

5. The method of claim 1, further comprising:
rendering, in the visual representation of the non-coded representation, the one or more glyphs associated with the coded character sequence at the location in the coded representation.

6. The method of claim 5, wherein:
rendering the one or more glyphs includes rendering the one or more glyphs as hidden text.

7. The method of claim 5, wherein:
rendering the one or more glyphs includes scaling the one or more glyphs to match one or more bounding boxes of one or more of the plurality of characters of text in the visual representation of the non-coded representation.

8. The method of claim 1, further comprising:
storing the coded representation and the non-coded representation in a single document.

9. The method of claim 1, further comprising:
storing the coded representation in a first document; and
storing the non-coded representation in a second document;
wherein associating the coded representation with the non-coded representation includes associating the first document with the second document.

10. The method of claim 1, further comprising:
rendering, in the visual representation of the non-coded representation, the one or more glyphs associated with the coded character sequence at the location in the coded representation to highlight the portion of the non-coded visual representation associated with the coded character sequence.

11. A system, comprising:
one or more computers;
a display device;
one or more storage devices;
a computer program product on the one or more storage devices, the computer program product operable to cause the one or more computers to perform operations comprising:
receive text coding information identifying each of a plurality of characters of text represented by the non-coded representation;
based on the text coding information, generate a coded representation that:
    specifies, for each of the plurality of characters of text represented by the non-coded representation, a respective code value based on a character encoding, the code value selected to represent the respective character of text, and
    associates a particular glyph from a collection of glyphs with each of the code values specified for the plurality of characters of text, the particular glyph selected independently of any relation to the respective character of text, the collection of glyphs being insufficient to semantically represent the plurality of characters of text;

associate the coded representation with the non-coded representation, wherein a code value of one of the plurality of characters of text is associated with one or more positions in a visual representation of the non-coded representation;

display the visual representation of the non-coded representation;

search the coded representation to find a coded character sequence that includes one or more characters at a location in the coded representation; and highlight, in the displayed visual representation of the non-coded representation, the portion of the non-coded visual representation associated with the coded character sequence at the location in the coded representation.

12. The system of claim 11, wherein:
the collection of glyphs consists of a single glyph.

13. The system of claim 11, wherein:
generating a coded representation includes specifying a font that defines the collection of glyphs and associating each code value with a glyph in the collection of glyphs.

14. The system of claim 11, wherein:
the collection of glyphs includes a default glyph, and the font associates one or more code values representing corresponding one or more characters of text with the default glyph.

15. The system of claim 11, wherein the computer program product is further operable to:
render, in the visual representation of the non-coded representation, the one or more glyphs associated with the coded character sequence at the location in the coded representation.

16. The system of claim 15, wherein:
rendering the one or more glyphs includes rendering the one or more glyphs as hidden text.

17. The system of claim 15, wherein:
rendering the one or more glyphs includes scaling the one or more glyphs to match one or more bounding boxes of one or more of the plurality of characters of text in the visual representation of the non-coded representation.

18. The system of claim 11, further comprising:
rendering, in the visual representation of the non-coded representation, the one or more glyphs associated with the coded character sequence at the location in the coded representation to highlight the portion of the non-coded visual representation associated with the coded character sequence.

19. A computer program product, embodied on a machine-readable storage device, for searching an electronic document that includes a non-coded representation of characters of text, the computer program product including instructions operable to cause data processing apparatus to:

receive text coding information identifying each of a plurality of characters of text represented by the non-coded representation;

based on the text coding information, generate a coded representation that:

specifies, for each of the plurality of characters of text represented by the non-coded representation, a respective code value based on a character encoding, the code value selected to represent the respective character of text, and associates a particular glyph from a collection of glyphs with each of the code values specified for the plurality of characters of text, the particular glyph selected independently of any relation to the respective character of text, the collection of glyphs being insufficient to semantically represent the plurality of characters of text;

associate the coded representation with the non-coded representation, wherein a code value of one of the plurality of characters of text is associated with one or more positions in a visual representation of the non-coded representation;

displaying the visual representation of the non-coded representation;

searching the coded representation to find a coded character sequence that includes one or more characters at a location in the coded representation; and highlighting, in the displayed visual representation of the non-coded representation, the portion of the non-coded visual representation associated with the coded character sequence at the location in the coded representation.

20. The computer program product of claim 19, wherein instructions operable to cause data processing apparatus to generate a coded representation include instructions operable to cause data processing apparatus to:
specify a font that defines the collection of glyphs and associates each code value with a glyph in the collection of glyphs.

21. The computer program product of claim 20, wherein:
the collection of glyphs includes a default glyph, and the font associates one or more code values representing corresponding one or more characters of text with the default glyph.

22. The computer program product of claim 19, wherein:
the collection of glyphs consists of a single glyph.

23. The computer program product of claim 19, further comprising instructions operable to cause data processing apparatus to:
render, in the visual representation of the non-coded representation, the one or more glyphs associated with the coded character sequence at the location in the coded representation.

24. The computer program product of claim 23, wherein instructions operable to cause data processing apparatus to render a glyph include instructions operable to cause data processing apparatus to:
scale the one or more glyphs to match one or more bounding boxes of one or more of the plurality of characters of text in the visual representation of the non-coded representation.

25. The computer program product of claim 19, further comprising instructions operable to cause data processing apparatus to:
render, in the visual representation of the non-coded representation, the one or more glyphs associated with the coded character sequence at the location in the coded representation to highlight the portion of the non-coded visual representation associated with the coded character sequence.

26. The system of claim 11, wherein the computer program product is further operable to:
store the coded representation and the non-coded representation in a single document.

27. The system of claim 11, wherein the computer program product is further operable to:
store the coded representation in a first document; and
store the non-coded representation in a second document;

wherein associating the coded representation with the non-coded representation includes associating the first document with the second document.

28. The computer program product of claim 19, further comprising instructions operable to cause data processing apparatus to:
render the one or more glyphs includes rendering the one or more glyphs as hidden text.

29. The computer program product of claim 19, further comprising instructions operable to cause data processing apparatus to:
store the coded representation and the non-coded representation in a single document.

30. The computer program product of claim 19, further comprising instructions operable to cause data processing apparatus to:
store the coded representation in a first document; and
store the non-coded representation in a second document;
wherein associating the coded representation with the non-coded representation includes associating the first document with the second document.

\* \* \* \* \*